(12) United States Patent
Tao et al.

(10) Patent No.: US 11,741,072 B2
(45) Date of Patent: Aug. 29, 2023

(54) METHOD AND APPARATUS FOR REAL-TIME INTERACTIVE RECOMMENDATION

(71) Applicant: ALIBABA GROUP HOLDING LIMITED, Grand Cayman (KY)

(72) Inventors: Jun Tao, Cupertino, CA (US); Shuyu Ai, Hangzhou (CN); Xu Xie, Fremont, CA (US); Keyao Zhu, San Jose, CA (US); Yun Liu, Hangzhou (CN); Jianhua Wen, Hangzhou (CN); Yuliang Yan, Hangzhou (CN); Jun Lang, Hangzhou (CN); Luo Si, Seattle, WA (US)

(73) Assignee: Alibaba Group Holding Limited, Grand Cayman (KY)

( * ) Notice: Subject to any disclaimer, the term of this patent is extended or adjusted under 35 U.S.C. 154(b) by 13 days.

(21) Appl. No.: 16/622,253

(22) PCT Filed: Jun. 14, 2017

(86) PCT No.: PCT/CN2017/088279
§ 371 (c)(1),
(2) Date: Dec. 12, 2019

(87) PCT Pub. No.: WO2018/227437
PCT Pub. Date: Dec. 20, 2018

(65) Prior Publication Data
US 2020/0104288 A1 Apr. 2, 2020

(51) Int. Cl.
*G06F 16/00* (2019.01)
*G06F 16/23* (2019.01)
*G06N 20/00* (2019.01)

(52) U.S. Cl.
CPC ............ *G06F 16/23* (2019.01); *G06N 20/00* (2019.01)

(58) Field of Classification Search
CPC .. G06F 16/9535; G06F 3/0488; G06F 3/0482; G06F 3/04842; G06F 3/0486;
(Continued)

(56) References Cited

U.S. PATENT DOCUMENTS

| 8,396,760 B1 | 3/2013 | Bradley et al. |
| 8,478,664 B1 | 7/2013 | Xavier et al. |

(Continued)

FOREIGN PATENT DOCUMENTS

| CN | 103927354 A | 7/2014 |
| CN | 105868332 A | 8/2016 |
| CN | 106844680 A | 6/2017 |

OTHER PUBLICATIONS

PCT International Search Report and Written Opinion dated Feb. 24, 2018, issued in corresponding International Application No. PCT/CN2017/088279 (7 pages).

*Primary Examiner* — Shyue Jiunn Hwa
(74) *Attorney, Agent, or Firm* — Finnegan, Henderson, Farabow, Garrett & Dunner, LLP

(57) ABSTRACT

An interactive recommendation system is provided. The system comprises an information generation module configured to: provide a set of information contents for outputting in an information interface, wherein each of the set of information contents is associated with an information item; receive a selection of one of the set of information contents that signals the user's interest or disinterest in an information item; determine, based on a model and history data related to prior activities of the user including a plurality of selections from the set of information contents, one or more information items to be included in recommendation information for the user; provide the recommendation information for outputting in a recommendation information interface; and update, based on the history data, the set of
(Continued)

information contents for outputting in the information interface.

22 Claims, 9 Drawing Sheets

(58) Field of Classification Search
CPC .......... G06F 3/04883; G06F 16/24578; G06F 16/93; G06F 16/3322; G06F 16/3338; G06F 16/335; G06F 16/337; G06F 16/435; G06F 16/9038; G06F 16/9536; G06F 2216/03; G06F 3/04817; G06F 40/205; G06F 40/232; G06F 40/253; G06F 40/274; G06F 40/30; G06F 7/026; G06F 7/24; G06F 16/248; G06F 16/252; G06F 16/54; G06F 16/951; G06F 3/04845; G06F 16/1834; G06F 16/437; G06F 16/23; G06F 3/048; G06F 3/0481; G06F 3/0484; G06F 9/451; G06F 16/40; G06F 16/9035; G06F 21/335; G06F 21/2618; G06F 21/6227; G06F 21/6236; G06F 21/6245; G06F 21/6272; G06F 21/629; G06F 2221/2115; G06F 2221/2117; G06F 2221/2119; G06F 2221/2141; G06F 2221/2149; G06F 16/90324; G06F 16/906; G06F 16/909; G06F 16/9532; G06F 16/9537; G06F 16/9538

See application file for complete search history.

(56) References Cited

U.S. PATENT DOCUMENTS

| | | | | |
|---|---|---|---|---|
| 2010/0228693 | A1* | 9/2010 | Dawson | G06F 40/30 |
| | | | | 707/769 |
| 2014/0280554 | A1* | 9/2014 | Webb | H04L 67/22 |
| | | | | 709/204 |
| 2015/0046496 | A1* | 2/2015 | Karmarkar | G06F 3/013 |
| | | | | 707/798 |
| 2015/0370898 | A1* | 12/2015 | Ahmed | G06F 16/48 |
| | | | | 707/723 |
| 2016/0004394 | A1* | 1/2016 | Macadaan | G06Q 30/0255 |
| | | | | 715/747 |
| 2016/0041998 | A1* | 2/2016 | Hall | G06F 16/7867 |
| | | | | 707/725 |

* cited by examiner

| Features | "Car dealership" |
|---|---|
| 133 — How many times the information item appeared in the portal when operated by the user? | 1 |
| 134 — How many times the user selected the information item? | 2 |
| 135 — How many times the information item is included in a search query? | 1 |
| 136 — How many times the user selected an interest hint linked to the information item? | 5 |
| 137 — How many times the user accessed the information item after selecting the interest hint? | 5 |
| 138 — How many times the user selected a disinterest hint about the information item? | 0 |

METHOD AND APPARATUS FOR REAL-TIME INTERACTIVE RECOMMENDATION

CROSS-REFERENCE TO RELATED PATENT APPLICATIONS

This application is a national stage filing under 35 U.S.C. § 371 of International Application No. PCT/CN2017/088279, filed Jun. 14, 2017, the contents of which are incorporated herein by reference in its entirety.

TECHNICAL FIELD

The present disclosure generally relates to the field of computer software, and more particularly, to a method and an apparatus for real-time interactive recommendation.

BACKGROUND

A recommendation system can predict a user's interest, and provide the user with recommendation information that reflects the user's interest. The information is typically generated by a remote server and provided to a user device, which then outputs the received information to a user over a software interface (e.g., a display interface, an audio interface, etc.). The content of the recommendation information can be generated based on user behavior history, such as the usage history of a specific software application, which can reflect the user's interest. For example, a social network application may generate information to recommend candidates for networking to a user based on, for example, a history of the user in networking with other people with similar profiles as the candidates, via the social network application.

Although the user behavior history can sometimes provide an accurate indication of a user's interest over a long period of time, the user behavior history is accumulative, and is typically not well-suited for tracking changes of a user's interest in a timely manner. As a result, it may take a long time before the user behavior history accumulates sufficient amount of data to manifest the change in the user's interest, to cause the recommendation system to update the information recommended to the user. As a result, the recommendation system may provide information that the user does not want. All these can lead to a waste of network and computation resources, as well as a poor user experience.

SUMMARY

Embodiments of the present disclosure provide an interactive recommendation system. The system comprises an information generation module configured to: provide a set of information contents for outputting in an information interface, wherein each of the set of information contents is associated with an information item; receive a selection of one of the set of information contents that signals the user's interest or disinterest in an information item; determine, based on a model and history data related to prior activities of the user including a plurality of selections from the set of information contents, one or more information items to be included in recommendation information for the user; provide the recommendation information for outputting in a recommendation information interface; and update, based on the history data, the set of information contents for outputting in the information interface.

Embodiments of the present disclosure also provide a method of for generating recommendation information, the method comprising: providing a set of information contents for outputting in an information interface, wherein each of the set of information contents is associated with an information item; receiving, from the user, a selection of one of the set of information contents that signals the user's interest or disinterest in an information item; determining, based on a model and history data related to prior activities of the user including a plurality of selections from the set of information contents, one or more information items to be included in recommendation information for the user; providing, in a recommendation information interface, the recommendation information; and updating, based on the history data, the set of information contents for outputting in the information interface.

Embodiments of the present disclosure also provide a non-transitory computer readable medium that is executable by one or more processors of a device that provides interactive recommendation, the method comprising: providing a set of information contents for outputting in an information interface, wherein each of the set of information contents is associated with an information item; receiving, from the user, a selection of one of the set of information contents that signals the user's interest or disinterest in an information item; determining, based on a model and history data related to prior activities of the user including a plurality of selections from the set of information contents, one or more information items to be included in recommendation information for the user; providing, in a recommendation information interface, the recommendation information; and updating, based on the history data, the set of information contents for outputting in the information interface.

Additional objects and advantages of the disclosed embodiments will be set forth in part in the following description, and in part will be apparent from the description, or may be learned by practice of the embodiments. The objects and advantages of the disclosed embodiments may be realized and attained by the elements and combinations set forth in the claims.

It is to be understood that both the foregoing general description and the following detailed description are exemplary and explanatory only and are not restrictive of the disclosed embodiments, as claimed.

BRIEF DESCRIPTION OF THE DRAWINGS

FIGS. 2A-2D are block diagrams illustrating components of the exemplary system of FIGS. 1A-1B.

DESCRIPTION OF THE EMBODIMENTS

Figure 1A:
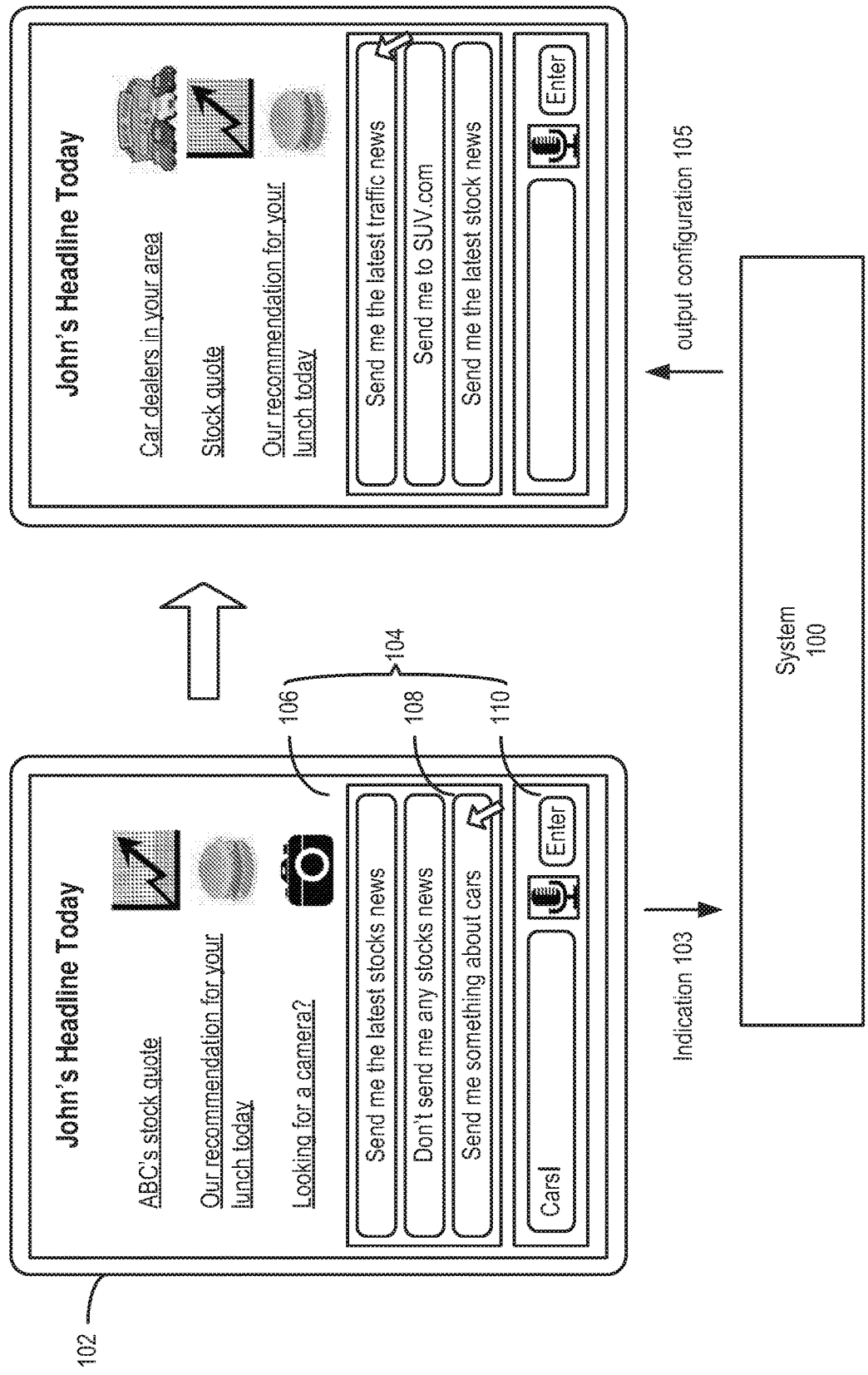
FIGS. 1A-1C are block diagrams illustrating an exemplary interactive recommendation system consistent with embodiments of the present disclosure.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims.

Embodiments of the present disclosure provide a real-time interactive recommendation system. The recommendation system can output a set of information contents to be selected by a user. The information contents are configured to, when selected, provide an indication of the user's interest or disinterest in an information item. The information contents are ranked according to a predicted likelihood of user's interest in the information item, and are output in an order that reflects the ranking. Responsive to detecting a selection of the information contents, the recommendation system can include, in the recommendation information, the information item associated with the selected information contents.

Embodiments of the present disclosure also use a machine learning algorithm to predict the likelihood of user's interest in an information item. The machine learning algorithm can process a set of features associated with an information item to predict the likelihood of user's interest in the information item. The machine learning algorithm can also be trained based on a history of the user's prior activities, including prior selections of information contents and recommendation information related to the information item, to improve the accuracy of the prediction.

With embodiments of the present disclosure, the recommendation system can track changes in the user's interest in a more efficient manner, and can provide recommendation information that is more likely to be aligned with the user's interest when the recommendation information is provided. As a result, utilization of network resources, as well as user experience, can be improved.

According to some embodiments, the operations, techniques, and/or components described herein can be implemented by an electronic device, which can include one or more special-purpose computing devices. The special-purpose computing devices can be hard-wired to perform the operations, techniques, and/or components described herein, or can include digital electronic devices such as one or more application-specific integrated circuits (ASICs) or field programmable gate arrays (FPGAs) that are persistently programmed to perform the operations, techniques and/or components described herein, or can include one or more hardware processors programmed to perform such features of the present disclosure pursuant to program instructions in firmware, memory, other storage, or a combination. Such special-purpose computing devices can also combine custom hard-wired logic, ASICs, or FPGAs with custom programming to accomplish the technique and other features of the present disclosure. The special-purpose computing devices can be desktop computer systems, portable computer systems, handheld devices, networking devices, or any other device that incorporates hard-wired and/or program logic to implement the techniques and other features of the present disclosure.

The one or more special-purpose computing devices can be generally controlled and coordinated by operating system software, such as iOS, Android, Blackberry, Chrome OS, Windows XP, Windows Vista, Windows 7, Windows 8, Windows Server, Windows CE, Unix, Linux, SunOS, Solaris, VxWorks, or other compatible operating systems. In other embodiments, the computing device can be controlled by a proprietary operating system. Operating systems control and schedule computer processes for execution, perform memory management, provide file system, networking, I/O services, and provide a user interface functionality, such as a graphical user interface ("GUI"), among other things.

Reference is now made to FIG. 1A, which illustrates an exemplary system 100 for real-time interactive recommendation. System 100 can include one or more computer servers that form a part of a cloud-based data processing platform. System 100 can communicate with a user device 102 that operates a portal 104 and generate, based on the communication, recommendation information for outputting at portal 104. Portal 104 can be a part of a mobile app operating on user device 102. In some embodiments, portal 104 can be an application, a window, a widget, a browser plugin, or an application plugin operating on a computer, such as a mobile, a laptop, a desktop computer, a network computer, a terminal of a computer system, or a control panel of an automobile.

As shown in FIG. 1A, portal 104 can include a recommendation information interface 106, an information interface 108, and an input interface 110. Recommendation information interface 106 can be configured to display recommendation information. Information interface 108 can be configured to display a set of information contents for a user. Each information content can be configured to, when selected by the user, provide an indication of the user's interest or disinterest in an information item (e.g., an object, a topic, a document, a link, etc.). Information interface 108 may also include a touch interface to detect a selection (e.g., by a gesture, etc.) of one of the set of information contents, and generate the indication of user's interest or disinterest in the information item. Further, input interface 110 can be configured to receive a user's input search query (e.g., in the form of text, audio, etc.) to a search engine. Input interface 110 can also accept a user's selection of the set of information contents displayed in information interface 108. As an illustrative example, a user can type in, or speak, one of the set of information contents displayed on information interface 108, to select that information content.

Portal 104 can extract information that reflects a user's interest from the user's inputs to information interface 108 and to input interface 110. For example, each of the set of information contents may indicate a user's potential interest in an information item (e.g., "send me the latest stocks news") or the user's potential disinterest in an information item (e.g., "don't send me any stocks news"). After detecting a selection of the information content "send me the latest stocks news" (via one of information interface 108 or input interface 110), portal 104 may generate an indication 103 to signal that the user is interested in receiving information about the latest stocks news. In contrast, after detecting a selection of the information content "don't send me any stocks news," portal 104 may also generate indication 103 to signal that the user is disinterested in any stocks news. Further, the topic of search queries received via input interface 110 may also indicate the user's interest. Portal 104 can also provide the search queries, as a part of indication 103, to system 100.

Based on indication 103, system 100 can update the recommendation information displayed in recommendation information interface 106, or the sets of information contents displayed in information interface 108, or both. For example, as shown in FIG. 1A, after receiving an indication of user's interest in information about cars (e.g., based on a selection of the information content "send me something about cars") from portal 104, system 100 can provide predetermined information related to cars (e.g., a link to local car dealerships) to portal 104 for displaying in recommendation information interface 106.

In some embodiments, the predetermined information (e.g., the link to a local car dealership) can include information items that are determined to be of interest to the user based on indication 103. The information item can be selected from a set of candidate information items, each of which can be associated with a set of features that can be used to estimate the user's interest or disinterest in the information item. Referring to the example shown in FIG. 1A, system 100 may determine, based on the set of features associated with the link to the local car dealership, that the user is likely to be interested in accessing information about a local car dealership. System 100 can then provide the link for displaying in recommendation information interface 106.

In some embodiments, recommendation information interface 106 may be configured to display a set of information contents that includes one or more indicative or introductory information contents. After detecting a selection of one of indicative or introductory information contents, system 100 may perform the operations as described above. In some embodiments, after detecting a selection of one of indicative or introductory information contents, system 100 may not perform the operations as described above. In some embodiments, after detecting a selection of one of indicative or introductory information contents, portal 104 may extract information that reflects the user's interest as described above. But, system 100 may not update the recommendation information displayed in recommendation information interface 106 as described above.

Moreover, system 100 can also update the set of information contents displayed in information interface 108 to recommend additional information that is potentially of interest to the user, also based on information items related to the set of information contents. For example, as shown in FIG. 1A, after receiving the selection of the information content "Send me something about cars," system 100 can provide a different set of information contents directed to specific topics related to cars, such as "send me the latest traffic news," and "send me to SUV.com," for the user's selection. System 100 can also update the display order of the set of information contents to become more aligned with the user's interests. For example, as shown in FIG. 1A, at a certain time point the information content "Send me the latest stocks news" was displayed at the top of information interface 108, based on the (then) indication that the user was most interested in stocks news. After receiving indication 103, the system 100 determines that the user's current interest is in cars. System 100 can then control information interface 108 to display information contents related to cars at the top, instead of the information content "send me the latest stocks news." System 100 can transmit output configuration 105 including the updated recommendation information, the updated set of information contents, and their display locations, to portal 104. Portal 104 can then update the displaying of the recommendation information and/or the set of information contents according to output configuration 105.

In some embodiments, information interface 108 may be configured to display a set of information contents that include one or more indicative or introductory information contents. After detecting a selection of one of indicative or introductory information contents, system 100 may perform the operations as described above. In some embodiments, after detecting a selection of one of indicative or introductory information contents, system 100 may not perform the operations as described above. In some embodiments, after detecting a selection of one of indicative or introductory information, portal 104 may extract information that reflects the user's interest as described above. But, system 100 may not update the sets of information contents displayed in information interface 108 as described above.

As discussed above, system 100 can determine the information items included in the recommendation information and in the information contents based on a set of features associated with these information items. The set of features can be used to estimate a degree of user's interest or disinterest in that information item. System 100 can determine the set of features based on a variety of prior online activities related to that information item. The prior online activities may include, for example, prior search queries related to that information item, a set of previously-accessed web pages covering that information item, other activities taken by the user with respect to that information item (e.g., selecting a product on a web page to obtain additional information, purchasing the product, etc.), a plurality of selections from the information contents related to that information item, a history of using portal 104 to access the information item, etc. The data for these online activities can be collected within a predetermined period (e.g., seven days) preceding the time point when the recommendation information (and the information contents) are to be determined.

System 100 can determine the set of features based on a combination of the prior online activities of a user for whom the recommendation information (and the information contents) are to be provided, and the prior online activities of other users. Based on the set of features, system 100 can determine a score for an information item representing the likelihood that the user will be interested in the information item. Based on the scores, system 100 can determine a set of information items that are likely to be of interest to the user, and include the information items in the recommendation information for displaying in recommendation information interface 106. System 100 can also update the set of information contents displayed in information interface 108, based on the scores of the information items related to the set of information contents.

In some embodiments, the set of features can be presented in the form of a multi-dimensional vector, with each dimension of the vector representing a feature. Each feature can be associated with a particular prior online activity, and can be represented by a numerical value. Each numerical value can be determined based on, for example, a number of times the information item appears in that particular online activity within the predetermined period. Since a user interested in a particular information item is likely to engage more often in a particular online activity related to that information item (e.g., inputting a search query related to the information item, accessing a web page that covers the information item, etc.), the numerical values can reflect a degree of the user's interest (or a likelihood of user's interest) in that information item. Moreover, the set of features is also associated with a variety of different online activities, and can also provide a relatively objective estimation of the user's interest in a particular information item across various contexts.

In some embodiments, system 100 may assign a different weight to each of the set of features for the score determination, to further improve the accuracy of the estimation. The different weights can account for different manifestation of user interests based on different user habits and preferences, as well as changes in the user's interest. For example, a user may prefer using a search engine to search for information, and the history of prior online activities of the user may be dominated by the search activities. As a result, system 100 may assign a larger weight to the features representing the user's prior search queries, such that the user's prior search queries can exert a larger influence on the user interest estimation compared with other activities.

As another example, another user may prefer using the information contents in information interface 108 to obtain new information. The history of prior online activities may indicate that the user very often selected an information content related to a particular information item (e.g., "Send me something about cars" shown in FIG. 1A) provided by information interface 108, and then accessed another information item (e.g., a link related to car dealership) in recommendation information interface 106, which system 100 provided as a result of the user's selection of the information content. Based on this history, system 100 may assign a larger weight to the features representing the user's prior use of portal 104, to reflect that the user is more likely to select a particular information content, and then access a particular information item provided by portal 104 in response to the selection. With this arrangement, system 100 may be steered to prioritize displaying a particular information content, and a particular set of information items in the recommendation information after detecting the selection of that particular information content, when determining the information items to be provided in interfaces 106 and 108.

As another example, system 100 may also overrule the determination of a user's interest based on prior online activities, after receiving a contrary indication from the user. Such a contrary indication can be based on, for example, the user's most recent selection of a particular information content in information interface 108. For example, based on the history of prior online activities, system 100 may determine that the user is likely to be interested in stocks news. However, system 100 may receive a recent selection of an information content that signals the user's disinterest in stock news (e.g., selection of "Don't send me any stock news" in FIG. 1A). As another example, system 100 may receive a recent selection of an information content that signals the user's interest in cars (e.g., selection of "send me something about cars"). In both cases, system 100 can overrule the user interest determination, remove the information contents and recommendation information related to stock news from interfaces 106 and 108, and output information contents and/or recommendation information related to other information items instead. In some embodiments, after detecting a selection of an information content, system 100 may also assign a relatively large weight to a feature of an information item associated with the selection of the information content, to increase the degree of influence of that feature on the determination of user's interest in that information item.

In some embodiments, system 100 may employ a machine learning model, which may include a linear regression model, a deep neural network model, etc., to determine the weights associated with each of the set of features. The machine learning model can receive a multi-dimensional vector representing a set of features of an information item. Based on the numerical values of the multi-dimensional vector, and the weights associated with each of the numerical values (which represents a feature), the machine learning model can determine a score that represents a likelihood of user's interest in that information item. System 100 can then rank the likelihood of user interest in a set of candidate information items, and determine which information item to be included in the recommendation information and in the set of information contents, based on the ranking.

The weights can be determined or updated in a training process performed by a training module. The training process can be based on a history of prior activities of a set of users, with the objective of determining a set of weights that, when applied to the set of features of an information item, can provide a score that most accurately reflects the set of users' interest in the information item. The training process can start with the history of prior activities of a set of users, and then shift to the history of prior activities of a particular user for whom the recommendation information and/or the set of information contents are to be provided.

The training process may vary for different types of machine learning models. For example, in a case of a linear regression model, the score can be determined based on a weighted average of the numerical values of the multi-dimensional vector. The training module can also determine, based on data samples representing the users' prior access of a particular information item, a distribution of users' interest in that information item, as exhibited from the prior activities (e.g., a distribution of user's decisions in accessing the information item). The training module can then determine the weights that, when applied to the set of features, generate a set of scores that fit with the distribution. The fitting may indicate that the scores determined accurately predict the likelihood of users' interests in the information item, as evident in the history of access to the information item. In some embodiments, the training module can apply a least squares regression algorithm to perform the fitting for the weights determination.

As another example, in a case where a deep neural network model is used, the deep network model can be configured to generate an output value that reflects the probability that a user will access an information item included the recommendation information, or that a user will select an information content related to the information item. For example, the deep neural network model may include a hidden layer that stores the set of weights, and an output layer that generates a score based on a set of features input to the model, and the set of weights. The deep neural network model can also be trained, based on a set of features of the information items and the users' access history of the information items, to generate the set of weights. For example, for a combination of features of an information item, and the associated values, the deep neural network can be trained to maximize the probabilities of outputting a score that accurately predicts the user's access to the information item. In some embodiments, the training module may receive or determine a target distribution of the probabilities, and employ a stochastic gradient descent algorithm to update the weights, such that the normalized probabilistic distribution of the model output can conform to the target distribution.

Referring back to FIG. 1A, based on the scores determined from the machine learning model, system 100 can predict a degree of user's interest in a set of candidate information items, and can update the display of these information items in the recommendation information (in recommendation information interface 106) and in the set of information contents (in information interface 108). For example, as discussed above, system 100 can rank the information items based on the scores and, via output configuration 105, control recommendation information interface 106 to display the top-ranked information item at the top of information interface 108. Moreover, system 100 can also control information interface 108 to display the top-ranked information content at the top of the third interface, to catch the user's attention.

Figure 1B:
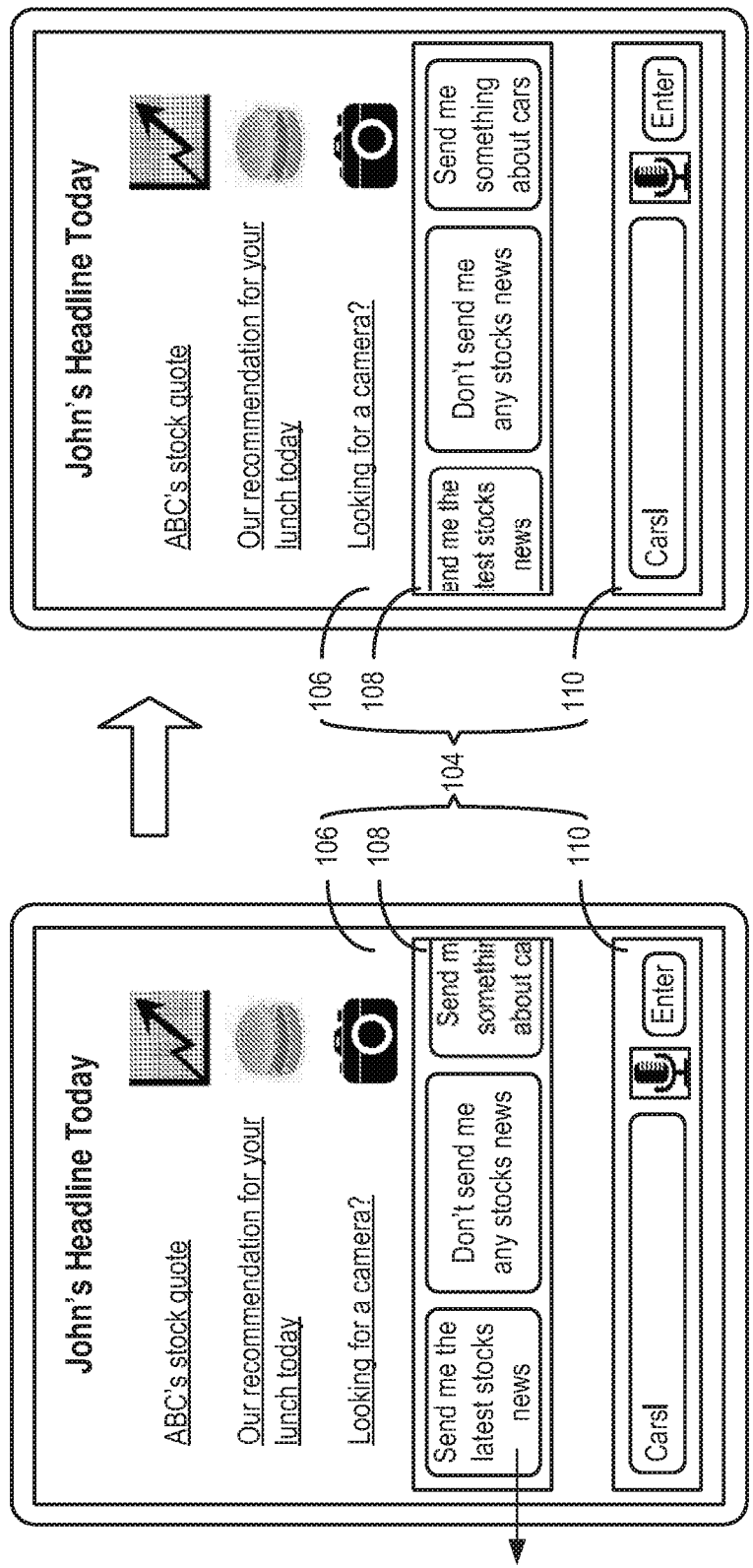
Figure 1C:
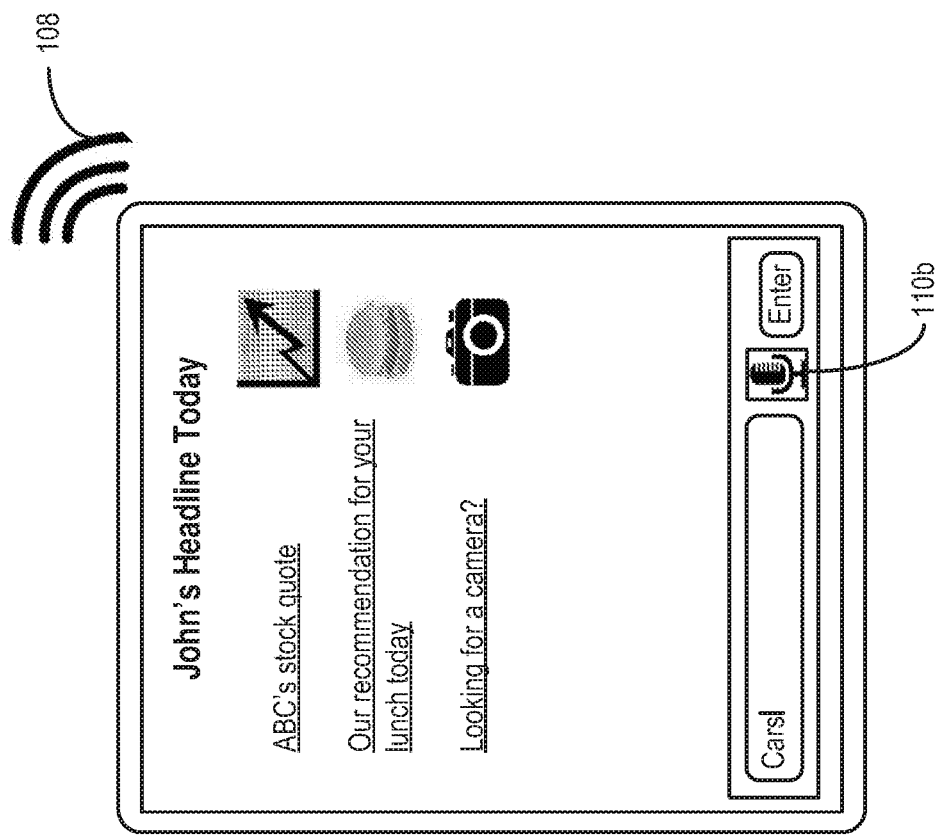

Consistent with embodiments of the present disclosure, there are other configurations of information interface 108. For example, referring to FIG. 1B, information interface 108 can provide a rolling effect, where the set of information contents are displayed as rolling along a predetermined direction (e.g., from right to left) across portal 104. The top-ranked information content, followed by other information contents on the right, can be displayed on the far left for a predetermined amount of time (e.g., 10 seconds), and will then roll and disappear in the left edge of information interface 108. Moreover, referring to FIG. 1C, information interface 108 can also be an audio interface. Under the control of system 100 via output configuration 105, information interface 108 can play, in audio form, the set of information contents in an order following the ranking of the information contents. A user can also provide audio instruction (e.g., by activating button 110b) to select one of the information contents that have been played.

By taking into consideration a range of user's activities with respect to an information item, including the selection of one or more information contents that signals the user's interest or disinterest in the information item, a recommendation system according to embodiments of the present disclosure can track and respond to changes in the user's interests in the information item. With such an arrangement, the system can provide recommendation information and information contents that are more aligned with the current interest of the user. As a result, the utility of the recommendation system, as well as the user experience, can be improved.

Figure 2A:
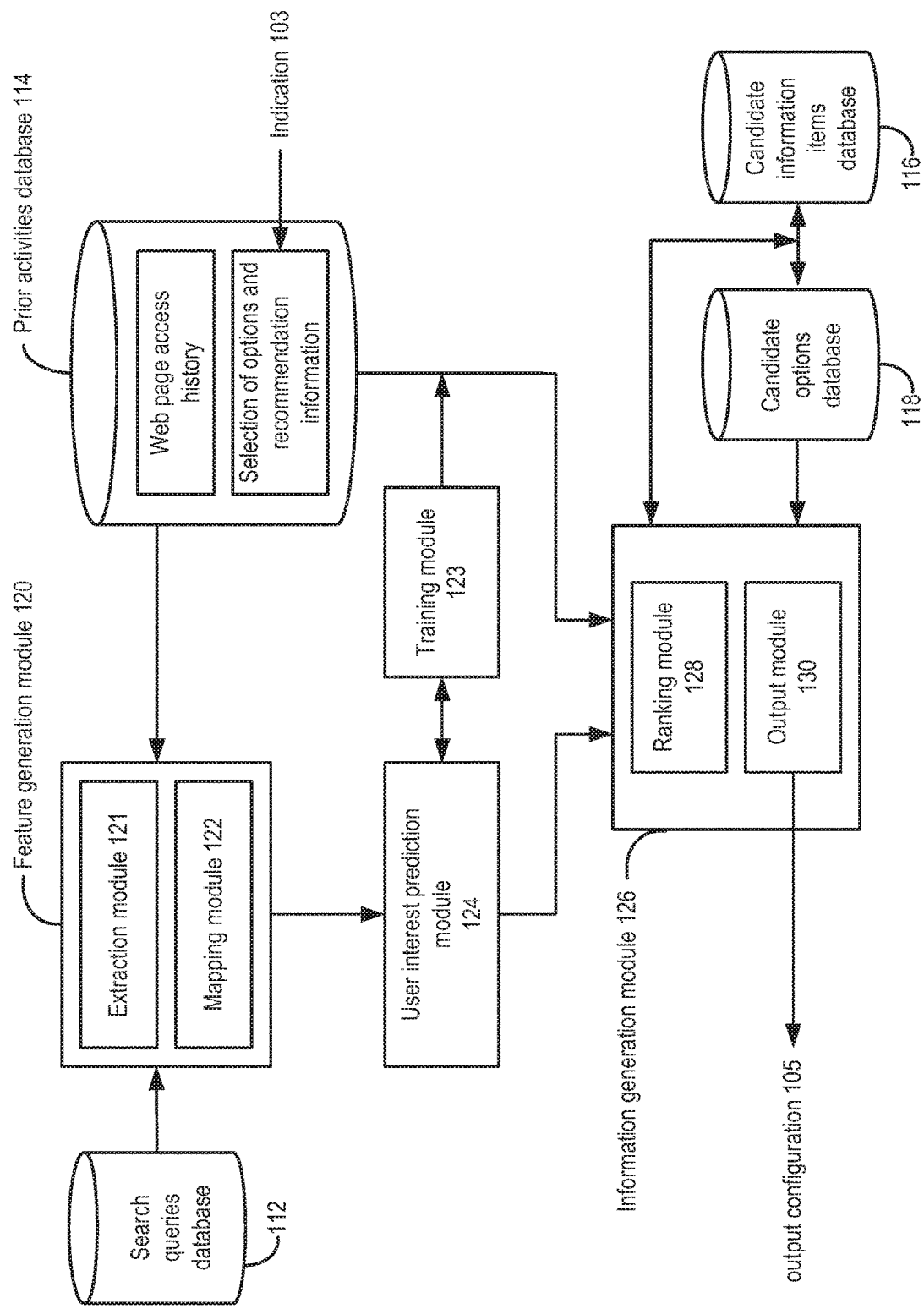

Reference is now made to FIG. 2A, which illustrates the exemplary components of system 100 consistent with embodiments of the present disclosure. As shown in FIG. 2A, system 100 includes a search queries database 112, a prior activities database 114, a candidate information items database 116, and a candidate information contents database 118.

Search queries database 112 may store a set of search queries previously provided by the users to a search engine (e.g., via input interface 110), which can provide the search queries to system 100 for storage in search queries database 112. Prior activities database 114 may store information related to a set of prior user's activities with respect to a particular information item. The set of activities may include, for example, selecting an information content provided on information interface 108 (acquired based on indication 103), accessing a web page, browsing specific sections of that web page that cover a certain product, purchasing a product, etc. As to be discussed in more details below, each of these activities can correspond to a feature of the information item. Moreover, prior activities database 114 may also associate each of these activities with a timestamp, so that a number of occurrences of each of these activities can be determined as a part of the features.

System 100 further includes a feature generation module 120, which includes an extraction module 121 and a mapping module 122. System 100 also includes a training module 123, a user interest prediction module 124, and an information generation module 126. The information generation module 126 further includes a ranking module 128 and an output module 130. As to be discussed in more details below, these modules can estimate the likelihood that a user is interested in a set of information items based on the information stored in search queries database 112 and prior activities database 114. If the estimated likelihood exceeds a threshold, these modules can select the information items to be included in the recommendation information and/or set of information contents for outputting in portal 104 to that user.

In general, the word "module," as used herein, can be a packaged functional hardware unit designed for use with other components (e.g., portions of an integrated circuit) or a part of a program (stored on a computer readable medium) that performs a particular function of related functions. The module can have entry and exit points and can be written in a programming language, such as, for example, Java, Lua, C or C++. A software module can be compiled and linked into an executable program, installed in a dynamic link library, or written in an interpreted programming language such as, for example, BASIC, Perl, or Python. It will be appreciated that software modules can be callable from other modules or from themselves, and/or can be invoked in response to detected events or interrupts. Software modules configured for execution on computing devices can be provided on a computer readable medium, such as a compact disc, digital video disc, flash drive, magnetic disc, or any other non-transitory medium, or as a digital download (and can be originally stored in a compressed or installable format that requires installation, decompression, or decryption prior to execution). Such software code can be stored, partially or fully, on a memory device of the executing computing device, for execution by the computing device. Software instructions can be embedded in firmware, such as an EPROM. It will be further appreciated that hardware modules can be comprised of connected logic units, such as gates and flip-flops, and/or can be comprised of programmable units, such as programmable gate arrays or processors. The modules or computing device functionality described herein are preferably implemented as software modules, but can be represented in hardware or firmware. Generally, the modules described herein refer to logical modules that can be combined with other modules or divided into sub-modules despite their physical organization or storage.

Feature generation module 120 can generate a set of features associated with an information item. As discussed above, the set of features can be used to estimate a likelihood of user's interest in the information item. Each feature can represent a particular prior activity of the user with respect to the information item. Each feature can also be associated with a numerical value that represents, for example, how many times the information items appear in a history log of the particular prior activity associated with the feature within a predetermined time period (e.g., seven days).

Reference is now made to FIG. 2B, which illustrates an example of a data structure 132 that stores a set of features of an information item ("car dealership"). As shown in FIG. 2B, an information item can be associated with features 133-138. Each feature is associated with a certain activity of the user. For example, feature 133 may correspond to how many times a particular information item appears in recommendation information provided to the user via portal 104. Feature 134 may correspond to how many times the user selected that information item (e.g., by clicking a link to access a web page, making a purchase decision of an object, etc.). Feature 135 may correspond to how many times the user included the information item in a search query. Feature 136 may correspond to how many times the user selected an information content that signals interest in the information item, to acquire more information about the information item. Feature 137 may correspond to how many times the user accessed the information item (provided in the recommendation information) following the selection of the information content. Features 136 and 137, together, may reflect a preference of a user in using portal 104 (and more specifically, recommendation information interface 106 and information interface 108) to access a particular information item of interest. On the other hand, feature 138 may correspond to how many times the user selected an information content that signals disinterest in the information item.

The numerical values associated with each of features 133-138 can reflect the user's interest (or disinterest) in the information item manifested in the particular prior activity. For example, a higher value associated with features 134-137 can indicate that the user has performed an activity (e.g., a search) for that information items many times, which can reflect that the user is highly interested in the information item. In contrary, a non-zero value associated with feature 138, which reflects that the user has signaled disinterest in the information item at least once, can indicate that the user is not interested (or less likely to be interested) in the information item.

Moreover, as discussed above, some of the features 133-138 (e.g., features 136 and 137) may also reflect a user's habit in using portal 104 to obtain the information item, in addition to the user's interest in that information item. For example, based on the relatively large numbers associated with features 136 and 137, system 100 may determine not only that the user often selected an information content that is related to car dealership information item (via link 117a, as shown in FIG. 2B), but also that the user often followed through and accessed the car dealership information item provided in the recommendation information. Based on such history information, system 100 may prioritize providing a certain information content in information interface 108, with the expectation that the user is likely to select that information content, and then access the recommendation information provided as a result of the selection of that information content. As an illustrative example, referring to FIG. 1A, based on the operation history of portal 104, system 100 may prioritize providing the information content "Send me something about cars," and providing a link directed to car dealers after the information content is selected, with the expectation that the user is likely to select the information content and then access the link.

Referring back to FIG. 2A, extraction module 121 of feature generation module 120 can extract information items from search queries database 112 and prior activities database 114, and provide the extracted information items to mapping module 122 to generate the set of features for the information items as shown in FIG. 2B. For example, from search queries database 112, extraction module 121 can extract a set of keywords (e.g., via natural language processing, semantics analysis, etc.). Extraction module 121 can determine one or more information items associated with the set of keywords based on, for example, a mapping table that maps the set of keywords to the information items (not shown in FIG. 2A). Moreover, extraction module 121 can also acquire, from prior activities database 114, a log of web pages previously accessed by the user, extract information (e.g., author, title, metadata, etc.) of the web pages, and then determine one or more information items associated with the extracted web pages information. The determination can also be based on a mapping table that maps the web pages information to the information items (also not shown in FIG. 2A). Extraction module 121 can also obtain a log of selections of interest information contents and disinterest information contents, as well as recommendation information, and determine the information items associated with the information contents or included in the recommendation information, from candidate information items database 116 and candidate information contents database 118.

Extraction module 121 can also obtain a timestamp for each of the extracted information items. As discussed above, prior activities database 114 may also associate each of these activities with a timestamp. Extraction module 121 can obtain the timestamp based on the activity from which the information item is extracted. Extraction module 121 can then count a number of occurrences of an information item extracted from the same data source (e.g., a log about browsing web browsing) that occurred within a predetermined time, to associate the count with that activity. Extraction module 121 can then provide the count for different extracted information items, and the data sources of the extracted information items (e.g., a log about web browsing not through portal 104, a log of accessing recommendation information interface 106, a log of selections of information contents in information interface 108, etc.) to mapping module 122.

After receiving the information from extraction module 121, mapping module 122 can map the data sources of extraction to the features, and associate the counts with the features. For example, mapping module 122 can map the data source corresponding to the web pages accessed through the portal to feature 133, and set the numerical value associated with feature 133 to the count of an information item (e.g., car dealership) extracted from that particular data source. Mapping module 122 can also update data structure 132 with the feature values for different information items. Feature generation module 120 can then generate a multi-dimensional vector representing the set of features of the information item, and provide the vector to user interest prediction module 124.

User interest prediction module 124 can determine a score that represents the likelihood of user's interest in an information item, based on the multi-dimensional vector representing the set of features associated with the information item. User interest prediction module 124 may assign a different weight to each feature (represented by a dimension of the vector) to account for different manifestation of user interests based on different user habits and preferences, as well as changes in the user's interest. User interest prediction module 124 may include a machine learning model (e.g., a linear regression model, a deep neural network, etc.) to determine the weights and to compute the score based on the set of features. The weights can be set by training module 123, which can train the machine learning model based on the history of prior activities of the users obtained from search queries database 112 and prior activities database 114. Training module 123 can also employ various training algorithms such as, for example, a least squares regression algorithm, a stochastic gradient descent algorithm, etc., to perform the training. User interest prediction module 124 can then compute a score for a set of information items, and provide the scores to information generation module 126.

After receiving the set of scores, ranking module 128 (of information generation module 126) can rank a set of information items stored in candidate information items database 116, as well as the information contents related to the set of information items, based on the set of scores. Top-ranked information items can be the ones with the highest scores, which can reflect highest likelihood of user's interest. Output module 130 can then select a predetermined number (e.g., 10) of the top-ranked information items and top-ranked information contents to be provided to portal 104. For example, output module 130 can determine to provide the top-ranked information item (e.g., a link to a car dealership) to portal 104 for displaying in recommendation information interface 106. Output module 130 can also determine to provide the top-ranked information contents (e.g., "Send me the latest traffic news") to portal 104 for displaying in information interface 108.

Figure 2C:
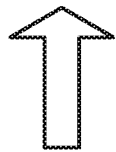

Ranking module 128 can also update the ranking of the information contents after system 100 detects a most recent selection of an information content. The updated ranking can then cause output module 130 to update the display of the information contents in information interface 108 to reflect the most up-to-date user's interest. FIG. 2C illustrates the change in the ranking of the information contents as shown in FIG. 1A. As shown in FIG. 2C, a certain time point the information content "Send me something about cars" was the top-ranked information content. Therefore, this information content was displayed at the top of information interface 108, as shown in FIG. 1A. Portal 104 then detects the selection of this information content, and transmits indication 103 to notify system 100 about the selection.

After receiving the indication that the user just selected the information content "Send me something about cars," which signals that user is interested in additional information about cars, ranking module 128 may update the ranking of this information content, and other information contents, to allow the user to see or select additional information about cars. For example, as shown in FIG. 2C, the rankings of the previously lower-ranked information contents (e.g., "Send me the latest traffic news," "Send me to SUV.com," etc.) will move up, while the ranking of the information content "Send me something about cars" will drop to the bottom. As a result of the changes in the ranking, as shown in FIG. 1A, the previously lower-ranked information contents can be displayed at the top of information interface 108, and the previously top-ranked information content that had just been selected ("Send me something about cars") can also be removed from second interface 208, to allow the user to explore various available additional information about cars.

Referring back to FIG. 2A, ranking module 128 can also update the rankings of the information contents in response to a selection of an information content that signals disinterest of an information item. For example, referring to FIG. 1A, after receiving the selection of the information content "Don't send me any stocks news," which signals that the user does not want to receive any recommendation information related to stock news, ranking module 128 can lower the ranking of that information content, or remove the information content from the predetermined set of information contents to be displayed altogether.

Figure 2D:
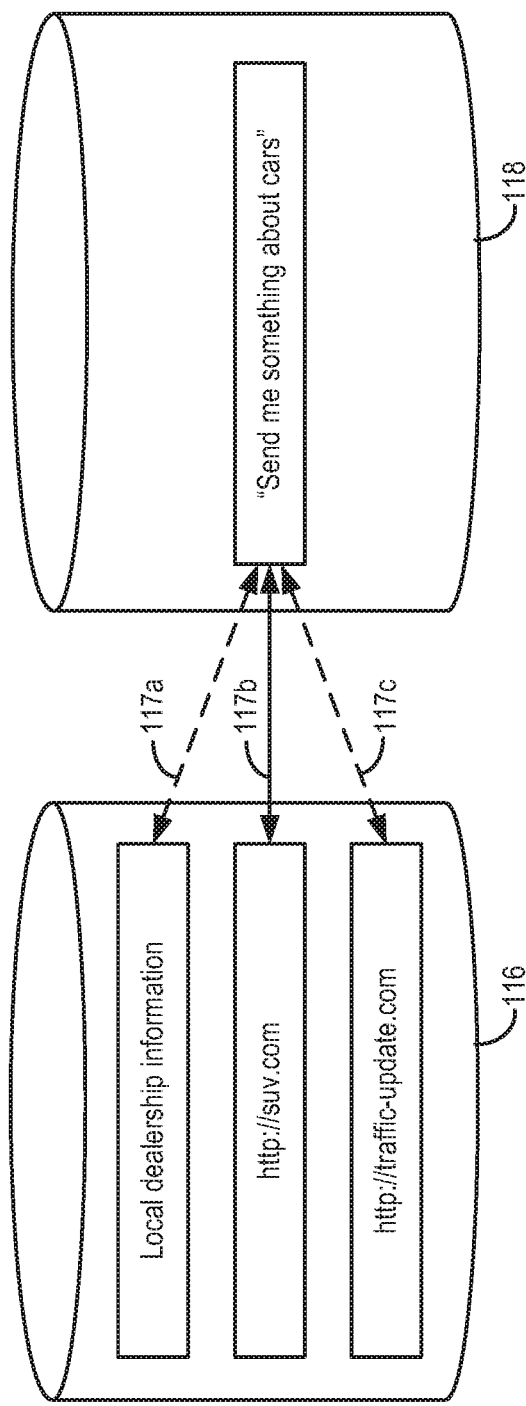

Output module 130 can also select, from candidate information contents database 118, an information content that is related to the top-ranked information item, and provide the information content to portal 104 for displaying in information interface 108. In some embodiments, as shown in FIG. 2D, the information contents stored in candidate information contents database 118 and the information items stored in candidate information items database can be associated with each other via one of links 117a-c, and output module 130 can acquire an information content from candidate information contents database 118 that is associated with the top-ranked information item.

The association between the information items and the information contents can also be updated to align with a user's habit in using the information content to access additional information, to facilitate the user's use of portal 104. For example, referring to FIG. 1A and FIG. 2D, at a certain time point the information content "Send me something about cars" was associated with the link to the top-ranked information item (the link to local dealership information). But then after the user selected the information content "Send me something about cars," the user accessed a link (e.g., http://suv.com, or a link http://traffic-update.com) via an external browser, instead of accessing the top-ranked information item (the link directed to local dealership information) displayed on recommendation information interface 106. In such a case, information generation module 126 can associate the information content "Send me something about cars" with the link http://suv.com (via link 117b), or associate the information content with the link http://traffic-update.com (via link 117c), and remove link 117a. As a result, the next time the user selects the information content "Send me something about cars," the links directed to SUV or traffic update can be provided in the recommendation information.

Figure 3:
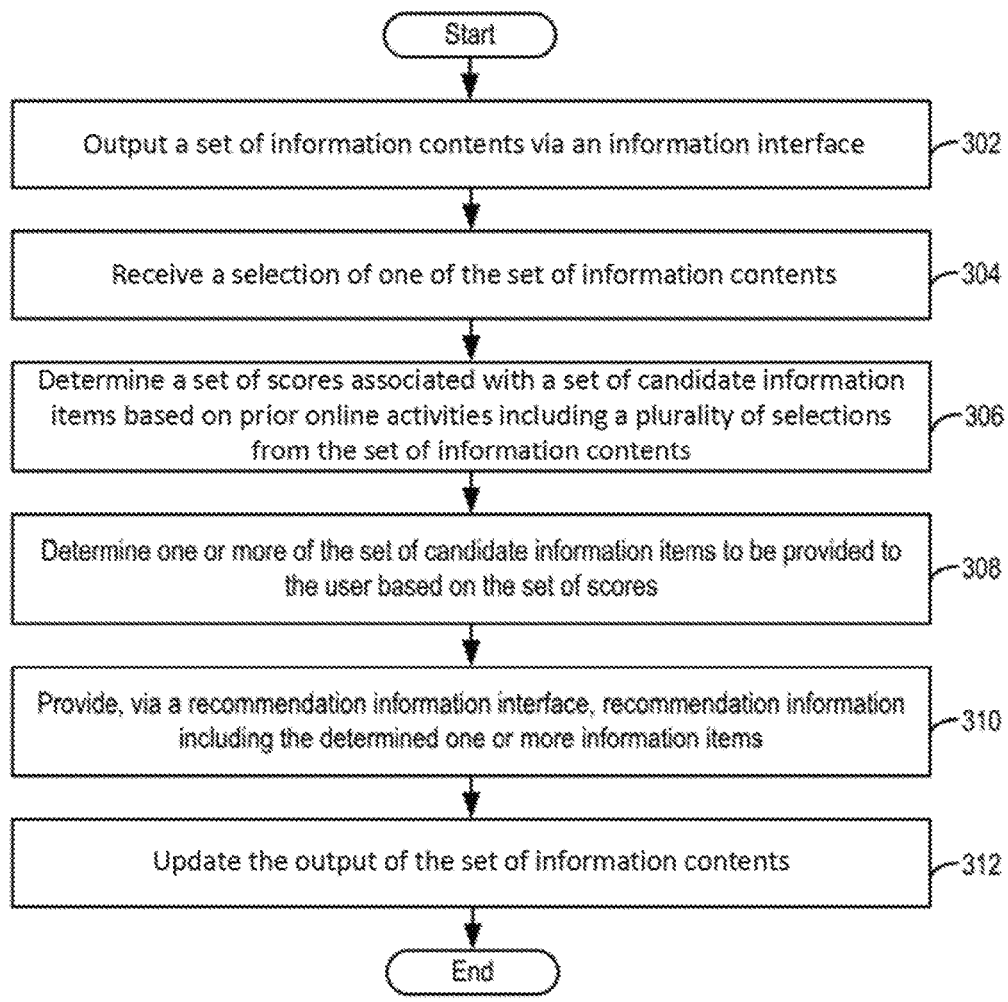
FIG. 3 is a flowchart illustrating an exemplary method of generating push notification consistent with embodiments of the present disclosure.

FIG. 3 is a flowchart representing an exemplary method 300 for generating recommendation information, consistent with embodiments of the present disclosure. It will be readily appreciated that the illustrated procedure can be altered to delete steps or further include additional steps. Method 300 can be performed by a server (e.g., systems 100 of FIG. 1A) that communicates with a user device (e.g. user device 102), which operates a portal.

After an initial start, the server controls the portal to output a set of information contents for selection, in step 302. Each of the set of information contents can be associated with an information item, and can be configured to provide an indication of the user's interest or disinterest in the information item. The set of information contents can be output in an information interface of the portal (e.g., information interface 108). The server then receives a selection of one of the information contents, in step 304. The server can receive an indication (e.g., indication 103) from the portal that signals the selection.

The system can then determine a set of scores associated with a set of candidate information items based on prior online activities including a plurality of selections from the information contents, in step 306. In some embodiments, the set of scores can represent a likelihood of user's interest in the set of candidate information items. The set of scores can be determined based on a set of features associated with each of the set of candidate information items. Each feature of the set of features can represent a predetermined activity of the user (e.g., accessing an information item from the portal, selecting an information content that signals interest in the information item, etc.), and can be associated with a number of occurrences of an information item in a log of the predetermined activity. Each set of features can be represented by a multi-dimensional vector, with each dimension representing a feature. A score can be determined, using a machine learning model, based on the numerical values of the multi-dimensional vector as well as a weight associated with each of the dimensions. The weights can be set by a training module that trains the machine learning model using prior online activities of the user.

Based on the set of scores, the system can determine one or more of the set of information items to be provided to the user, in step 308. The system can rank the set of candidate information items based on the set of scores, and select a set of top-ranked candidate information items to be provided to the user.

The system can then provide, via a recommendation information interface of the portal (e.g., recommendation information interface 106), the determined one or more information items, in step 310. The output of the information items can also be configured to reflect the ranking. For example, in a case where recommendation information interface 106 includes a display interface, the top-ranked information items can be displayed at the top of the interface, followed by lower-ranked information items below.

The system can also update the output of the set of information contents, in step 312. For example, the system may rank a set of candidate information contents based on the information items the information contents are related to (and the scores associated with these information items). The system can update the output of the set of information contents to provide the top-ranked information contents. The system can also update the ranking based on a recent selection of an information content, and to provide other information contents related to the selected information content, to provide additional information that can be of interest to the user. On the other hand, if the system detects that a selection of an information content that signals the user's disinterest in an information item, the system can also remove the information content related to the information item from being displayed on the information interface.

Figure 4:
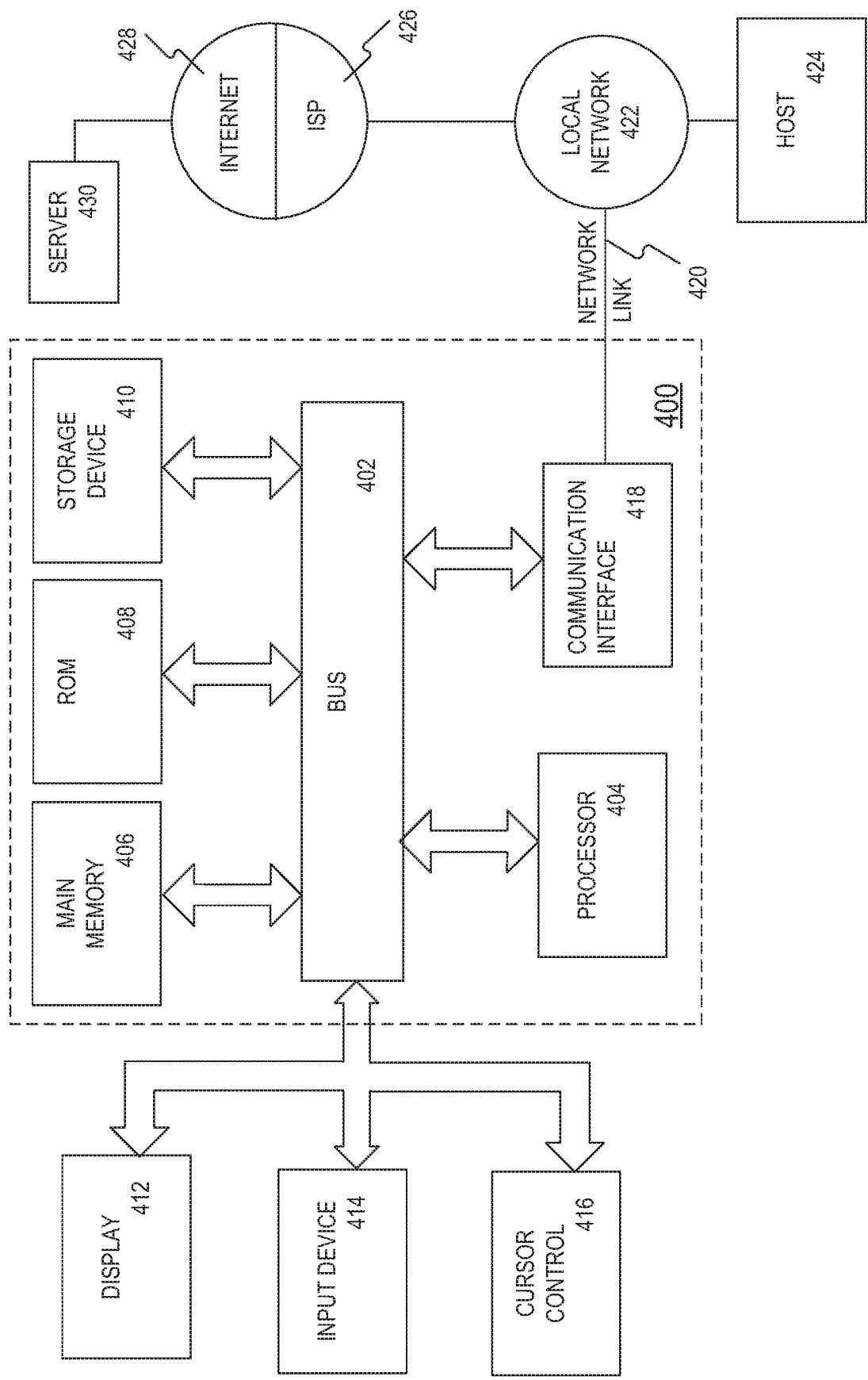
FIG. 4 is a block diagram illustrating an exemplary computer system on which embodiments described herein can be implemented.

FIG. 4 is a block diagram of an exemplary computer system 400 with which embodiments described herein can be implemented. Computer system 400 includes a bus 402 or other communication mechanism for communicating information, and one or more hardware processors 404 (denoted as processor 404 for purposes of simplicity) coupled with bus 402 for processing information. Hardware processor 404 can be, for example, one or microprocessors.

Computer system 400 also includes a main memory 406, such as a random access memory (RAM) or other dynamic storage device, coupled to bus 402 for storing information and instructions to be executed by processor 404. Main memory 406 also can be used for storing temporary variables or other intermediate information during execution of instructions to be executed by processor 404. Such instructions, after being stored in non-transitory storage media accessible to processor 504, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk, optical disk, or USB thumb drive (Flash drive), etc., is provided and coupled to bus 402 for storing information and instructions.

Computer system 400 can be coupled via bus 402 to a display 412, such as a cathode ray tube (CRT), a liquid crystal display (LCD), or a touch screen, for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. The input device typically has two degrees of freedom in two axes, a first axis (for example, x) and a second axis (for example, y), that allows the device to specify positions in a plane. In some embodiments, the same direction information and command selections as cursor control may be implemented via receiving touches on a touch screen without a cursor.

Computing system 400 can include a user interface module to implement a graphical user interface (GUI) that can be stored in a mass storage device as executable software codes that are executed by the one or more computing devices. This and other modules can include, by way of example, components, such as software components, object-oriented software components, class components and task components, processes, functions, fields, procedures, subroutines, segments of program code, drivers, firmware, microcode, circuitry, data, databases, data structures, tables, arrays, and variables. The modules may include, for example, components of system 100 of FIG. 2A.

Computer system 400 can implement the techniques described herein using customized hard-wired logic, one or more ASICs or FPGAs, firmware and/or program logic which in combination with the computer system causes or programs computer system 400 to be a special-purpose machine. According to some embodiments, the operations, functionalities, and techniques and other features described herein are performed by computer system 400 in response to processor 404 executing one or more sequences of one or more instructions contained in main memory 406. Such instructions can be read into main memory 506 from another storage medium, such as storage device 410. Execution of the sequences of instructions contained in main memory 406 causes processor 404 to perform the method steps (e.g., method 300 of FIG. 3) described herein. In alternative embodiments, hard-wired circuitry can be used in place of or in combination with software instructions.

The term "non-transitory media" as used herein refers to any non-transitory media storing data and/or instructions that cause a machine to operate in a specific fashion. Such non-transitory media can comprise non-volatile media and/or volatile media. Non-volatile media can include, for example, optical or magnetic disks, such as storage device 410. Volatile media can include dynamic memory, such as main memory 406. Non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, flash memory, register, cache, any other memory chip or cartridge, and networked versions of the same.

Non-transitory media is distinct from, but can be used in conjunction with, transmission media. Transmission media can participate in transferring information between storage media. For example, transmission media can include coaxial cables, copper wire and fiber optics, including the wires that comprise bus 402. Transmission media can also take the form of acoustic or light waves, such as those generated during radio-wave and infra-red data communications.

Various forms of media can be involved in carrying one or more sequences of one or more instructions to processor 404 for execution. For example, the instructions can initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 can optionally be stored on storage device 410 either before or after execution by processor 504.

Computer system 400 can also include a communication interface 418 coupled to bus 402. Communication interface 418 can provide a two-way data communication coupling to a network link 420 that can be connected to a local network 422. For example, communication interface 418 can be an integrated services digital network (ISDN) card, cable modem, satellite modem, or a modem to provide a data communication connection to a corresponding type of telephone line. As another example, communication interface 418 can be a local area network (LAN) card to provide a data communication connection to a compatible LAN. Wireless links can also be implemented. In any such implementation, communication interface 418 can send and receive electrical, electromagnetic or optical signals that carry digital data streams representing various types of information.

Network link 420 can typically provide data communication through one or more networks to other data devices. For example, network link 420 can provide a connection through local network 422 to a host computer 424 or to data equipment operated by an Internet Service Provider (ISP) 426. ISP 426 in turn can provide data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, can be example forms of transmission media.

Computer system 400 can send messages and receive data, including program code, through the network(s), network link 420 and communication interface 418. In the Internet example, a server 430 can transmit a requested code for an application program through Internet 428, ISP 426, local network 422 and communication interface 418.

The received code can be executed by processor 404 as it is received, and/or stored in storage device 410, or other non-volatile storage for later execution. In some embodiments, server 430 can provide information for being displayed on a display.

It will be appreciated that the present invention is not limited to the exact construction that has been described above and illustrated in the accompanying drawings, and that various modifications and changes can be made without departing from the scope thereof. It is intended that the scope of the invention should only be limited by the appended claims.

What is claimed is:

1. An interactive recommendation system comprising an information generation module configured to:
    provide a set of information contents for outputting in an information interface, each of the set of information contents being associated with an information item;
    receive a selection of one of the set of information contents that signals the user's interest or disinterest in the information item and an input of a search query to a search engine, wherein in receiving the input of the search query to the search engine, the information generation module is further configured to:
    extract a set of keywords of the input and a timestamp for the information item; and
    determine, based on a model and history data related to prior activities of the user including a plurality of selections from the set of information contents and the input of the search query, one or more information items that are to be included in recommendation information for the user and that are associated with the set of keywords based on a mapping table that maps the set of keywords to the one or more information items, wherein each of the prior activities is associated with the timestamp; and
    provide the recommendation information for outputting in a recommendation information interface.

2. The system of claim 1, wherein the information generation module is further configured to:
    update, based on the history data, the set of information contents for outputting in the information interface.

3. The system of claim 1, wherein the information generation module is further configured to:
    determine, based on the selection of the one of the set of information contents, disinterest in an information item associated with the one of the set of information contents; and
    remove the information item from the recommendation information.

4. The system of claim 2, wherein the information generation module is further configured to:
    determine, based on the selection of the one of the set of information contents, interest in an information item associated with the one of the set of information contents; and
    update the set of information contents for outputting in the information interface based on the information item.

5. The system of claim 1, wherein the history data comprises a log of a set of activities within a predetermined period; wherein the system further comprises a feature generation module configured to:
    determine a set of features for an information item of the one or more information items, wherein each feature of the set of features is associated with one of the set of activities, and
    determine, for each feature of set of features, a value representing a number of occurrences of the information item in the log of an activity of the set of activities associated with the each feature;
    wherein the system further comprises a user interest prediction module configured to determine a score that represents a likelihood of the user's interest in the information item based on the values; and
    wherein the information generation module is configured to provide the information item in the recommendation information interface based on the score.

6. The system of claim 5, wherein the information generation module is further configured to:
    determine the score for each of a set of candidate information items;
    rank the set of candidate information items based on the scores; and
    select the one or more information items from the candidate information items based on the ranking.

7. The system of claim 6, wherein the information generation module is further configured to:
    obtain a set of candidate information contents, wherein each of the set of candidate information contents is associated with one of the candidate information items;
    rank the set of candidate information contents based on the scores; and
    provide one or more of the set of candidate information contents as a part of the set of information contents for outputting in the information interface.

8. The system of claim 7, wherein the information generation module is further configured to control the information interface to output the one or more of the set of candidate information contents in an order based on the ranking of the set of candidate information contents.

9. A method for generating recommendation information, the method comprising:
- providing a set of information contents for outputting in an information interface, each of the set of information contents being associated with an information item;
- receiving, from the user, a selection of one of the set of information contents that signals the user's interest or disinterest in the information item and an input of a search query to a search engine, wherein receiving the input of the search query to the search engine further comprises:
- extracting a set of keywords of the input and a timestamp for the information item; and
- determining, based on a model and history data related to prior activities of the user including a plurality of selections from the set of information contents and the input of the search query, one or more information items that are to be included in recommendation information for the user and that are associated with the set of keywords based on a mapping table that maps the set of keywords to the one or more information items, wherein each of activities is associated with the timestamp; and
- providing, in a recommendation information interface, the recommendation information.

10. The method of claim 9, further comprising:
- updating, based on the history data, the set of information contents for outputting in the information interface.

11. The method of claim 9, further comprising:
- determining, based on the selection of the one of the set of information contents, disinterest in an information item associated with the one of the set of information contents; and
- removing the information item from the recommendation information.

12. The method of claim 10, further comprising:
- determining, based on the selection of the one of the set of information contents, interest in an information item associated with the one of the set of information contents; and
- updating the set of information contents for outputting in the information interface based on the information item.

13. The method of claim 9, wherein the history data comprises a log of a set of activities within a predetermined period; wherein the method further comprises:
- determining a set of features for an information item of the one or more information items, wherein each feature of the set of features is associated with one of the set of activities;
- determining, for each feature of set of features, a value representing a number of occurrences of the information item in the log of an activity of the set of activities associated with the each feature;
- determining a score that represents a likelihood of the user's interest in the information item based on the values; and
- providing the information item in the recommendation information interface based on the score.

14. The method of claim 13, further comprising:
- determining the score for each of a set of candidate information items;
- ranking the set of candidate information items based on the scores; and
- selecting the one or more information items from the candidate information items based on the ranking.

15. The method of claim 14, further comprising
- obtaining a set of candidate information contents, wherein each of the set of candidate information contents is associated with one of the candidate information items;
- ranking the set of candidate information contents based on the scores; and
- providing one or more of the set of candidate information contents as a part of the set of information contents for outputting in the information interface.

16. The method of claim 15, further comprising:
- controlling the information interface to output the one or more of the set of candidate information contents in an order based on the ranking of the set of candidate information contents.

17. A non-transitory computer-readable medium storing instructions that are executable by one or more processors of a device that provides interactive recommendation, the method comprising:
- providing a set of information contents for outputting in an information interface, each of the set of information contents being associated with an information item;
- receiving, from the user, a selection of one of the set of information contents that signals the user's interest or disinterest in the information item and an input of a search query to a search engine, wherein receiving the input of the search query to the search engine further comprises:
- extracting a set of keywords of the input and a timestamp for the information item; and
- determining, based on a model and history data related to prior activities of the user including a plurality of selections from the set of information contents and the input of the search query, one or more information items that are to be included in recommendation information for the user and that are associated with the set of keywords based on a mapping table that maps the set of keywords to the one or more information items, wherein each of activities is associated with the timestamp; and
- providing, in a recommendation information interface, the recommendation information.

18. The non-transitory computer-readable medium of claim 17, wherein the set of instructions that is executable by the one or more processors of the device to cause the device to further perform:
- updating, based on the history data, the set of information contents for outputting in the information interface.

19. The non-transitory computer-readable medium of claim 17, wherein the set of instructions that is executable by the one or more processors of the device to cause the device to further perform:
- determining, based on the selection of the one of the set of information contents, disinterest in an information item associated with the one of the set of information contents; and
- removing the information item from the recommendation information.

20. The non-transitory computer-readable medium of claim 18, wherein the set of instructions that is executable by the one or more processors of the device to cause the device to further perform:
- determining, based on the selection of the one of the set of information contents, interest in an information item associated with the one of the set of information contents; and updating the set of information contents for outputting in the information interface based on the information item.

21. The non-transitory computer-readable medium of claim 17, wherein the set of instructions that is executable by the one or more processors of the device to cause the device to further perform:
   determining a set of features for an information item of the one or more information items, wherein each feature of the set of features is associated with one of the set of activities;
   determining, for each feature of set of features, a value representing a number of occurrences of the information item in the log of an activity of the set of activities associated with the each feature;
   determining a score that represents a likelihood of the user's interest in the information item based on the values; and
   providing the information item in the recommendation information interface based on the score.

22. The non-transitory computer-readable medium of claim 21, wherein the set of instructions that is executable by the one or more processors of the device to cause the device to further perform:
   determining the score for each of a set of candidate information items;
   ranking the set of candidate information items based on the scores;
   selecting the one or more information items from the candidate information items based on the ranking;
   obtaining a set of candidate information contents, wherein each of the set of candidate information contents is associated with one of the candidate information items;
   ranking the set of candidate information contents based on the scores;
   providing one or more of the set of candidate information contents as a part of the set of information contents for outputting in the information interface; and
   controlling the information interface to output the one or more of the set of candidate information contents in an order based on the ranking of the set of candidate information contents.

\* \* \* \* \*